(12) United States Patent
Sterkel et al.

(10) Patent No.: US 9,099,847 B2
(45) Date of Patent: Aug. 4, 2015

(54) GATEWAY NODE

(71) Applicant: Florida Power & Light Company, Juno Beach, FL (US)

(72) Inventors: Gary Wayne Sterkel, Plantation, FL (US); George Alexander Pantouris, Juno Beach, FL (US); Alfred F. Arias, Miami, FL (US)

(73) Assignee: FLORIDA POWER AND LIGHT COMPANY, Juno Beach, FL (US)

( * ) Notice: Subject to any disclaimer, the term of this patent is extended or adjusted under 35 U.S.C. 154(b) by 0 days.

(21) Appl. No.: 14/284,010

(22) Filed: May 21, 2014

(65) Prior Publication Data
US 2014/0254069 A1    Sep. 11, 2014

Related U.S. Application Data

(63) Continuation of application No. 13/492,215, filed on Jun. 8, 2012, now Pat. No. 8,760,854.

(60) Provisional application No. 61/495,076, filed on Jun. 9, 2011.

(51) Int. Cl.
| | |
|---|---|
| *H02B 1/48* | (2006.01) |
| *H02B 3/00* | (2006.01) |
| *G01D 4/00* | (2006.01) |
| *G01D 11/24* | (2006.01) |
| *H04Q 9/00* | (2006.01) |

(52) U.S. Cl.
CPC .................. *H02B 1/48* (2013.01); *G01D 4/002* (2013.01); *G01D 11/24* (2013.01); *H02B 3/00* (2013.01); *Y02B 90/241* (2013.01); *Y04S 20/32* (2013.01); *Y10T 29/4902* (2015.01)

(58) Field of Classification Search
CPC .............. H02B 1/48; H02B 3/00; H02B 1/26; H04Q 9/00; H04Q 2209/30; G08C 15/06; G08C 19/00; G08D 23/00
USPC ......... 361/601, 622, 644, 659, 657, 641, 664; 340/870.02, 870.03, 870.04, 870.11, 340/870.12, 500, 506, 346, 662, 539.1, 340/825.69; 343/702, 719, 720, 872, 873; 370/208, 389, 229, 401, 437, 346, 299; 174/38, 39, 52.3, 58, 60
See application file for complete search history.

(56) References Cited

U.S. PATENT DOCUMENTS

| | | |
|---|---|---|
| 3,604,835 A | 9/1971 | Hamilton |
| RE27,400 E | 6/1972 | Nickola |
| 3,714,369 A | 1/1973 | Bunten |

(Continued)

FOREIGN PATENT DOCUMENTS

| | | |
|---|---|---|
| KR | 2009-278608 | 11/2009 |
| WO | WO 2009/083026 | 7/2009 |

OTHER PUBLICATIONS

Erwin Normanyo, et al.; "Telemetric Control of Traffic Lights Intersections in Ghana;" Proceedings of the World Congress on Engineering and Computer Science; 2009 pp. 1-8; vol. 1.

*Primary Examiner* — Michail V Datskovskiy
(74) *Attorney, Agent, or Firm* — Feldman Gale, PA; Rafael Perez-Piñeiro

(57) ABSTRACT

In accordance with one embodiment, a gateway node having a housing, a bracket mounted relay and wireless communication capabilities. The gateway node is connected to a pad mount transformer.

23 Claims, 7 Drawing Sheets

(56) References Cited

U.S. PATENT DOCUMENTS

| | | | |
|---|---|---|---|
| 4,803,632 A | 2/1989 | Frew et al. | |
| 4,833,618 A * | 5/1989 | Verma et al. | 702/62 |
| 4,977,482 A | 12/1990 | Langdon et al. | |
| 5,018,192 A | 5/1991 | Smith | |
| 5,298,894 A | 3/1994 | Cerny et al. | |
| 5,519,387 A * | 5/1996 | Besier et al. | 340/870.02 |
| 5,757,283 A | 5/1998 | Janoska | |
| 5,767,790 A * | 6/1998 | Jovellana | 340/870.02 |
| 5,877,703 A | 3/1999 | Bloss, Jr. et al. | |
| 5,898,387 A | 4/1999 | Davis et al. | |
| 6,150,955 A * | 11/2000 | Tracy et al. | 340/870.02 |
| 6,246,677 B1 | 6/2001 | Nap et al. | |
| 6,266,233 B1 | 7/2001 | O'Regan | |
| 6,414,605 B1 * | 7/2002 | Walden et al. | 340/870.02 |
| 6,462,269 B1 | 10/2002 | Leschinger et al. | |
| 6,617,976 B2 | 9/2003 | Walden et al. | |
| 6,747,368 B2 | 6/2004 | Jarrett, Jr. | |
| 6,778,099 B1 | 8/2004 | Meyer et al. | |
| 6,980,091 B2 | 12/2005 | White, II et al. | |
| 7,064,679 B2 | 6/2006 | Ehrke et al. | |
| 7,113,134 B1 | 9/2006 | Berkman | |
| 7,196,673 B2 * | 3/2007 | Savage et al. | 343/719 |
| 7,274,305 B1 | 9/2007 | Luttrell | |
| 7,277,027 B2 | 10/2007 | Ehrke et al. | |
| 7,283,063 B2 | 10/2007 | Salser, Jr. | |
| 7,321,291 B2 | 1/2008 | Gidge et al. | |
| 7,342,506 B2 * | 3/2008 | Paoli et al. | 340/870.02 |
| 7,402,993 B2 | 7/2008 | Morrison | |
| 7,508,834 B2 | 3/2009 | Berkman et al. | |
| 7,548,148 B2 | 6/2009 | Kersten | |
| 7,671,814 B2 * | 3/2010 | Savage et al. | 343/719 |
| 7,706,757 B2 | 4/2010 | Luglio et al. | |
| 7,746,246 B2 | 6/2010 | Salser, Jr. | |
| 7,804,763 B2 | 9/2010 | Berkman et al. | |
| 7,847,706 B1 * | 12/2010 | Ross et al. | 340/12.52 |
| 7,994,994 B2 * | 8/2011 | Savage et al. | 343/719 |
| 8,022,690 B2 | 9/2011 | Kagan | |
| 8,059,006 B2 | 11/2011 | Schweitzer et al. | |
| 8,189,577 B2 | 5/2012 | Vaswani et al. | |
| 8,284,107 B2 * | 10/2012 | Borisov et al. | 343/700 MS |
| 8,299,975 B2 * | 10/2012 | Savage et al. | 343/719 |
| 8,421,588 B1 * | 4/2013 | Ross et al. | 340/5.1 |
| 8,462,060 B2 | 6/2013 | Savage et al. | |
| 2003/0042794 A1 | 3/2003 | Jarrett, Jr. | |
| 2006/0181838 A1 | 8/2006 | Ely | |
| 2009/0076659 A1 | 3/2009 | Ensworth et al. | |
| 2009/0096603 A1 | 4/2009 | Langsweirdt et al. | |
| 2009/0167547 A1 | 7/2009 | Gilbert | |
| 2010/0328097 A1 | 12/2010 | Leo et al. | |

* cited by examiner

GATEWAY NODE

CROSS REFERENCE TO RELATED APPLICATIONS

This application is a continuation of U.S. application Ser. No. 13/492,215, filed Jun. 8, 2012, which claims the benefit of U.S. Provisional Application Ser. No. 61/495,076, filed Jun. 9, 2011, the disclosure of each which is hereby incorporated herein by reference in its entirety.

BACKGROUND OF THE INVENTION

Embodiments of the present invention generally relate to network communication devices, and more particularly to network communication devices used in an advanced metering infrastructure (AMI).

In recent years, many utility companies have developed and deployed advanced metering infrastructure (AMI) to improve or resolve existing problems with metering of utilities. One aspect of deploying an AMI involves replacement of traditional meters with smart meters, also known as AMI meters. AMI meters feature wireless communication capabilities, thus providing two-way communication between utility companies and the AMI meter. Two-way communication allows AMI meters to relay commodity utilization information and/or quality information directly to the utility company. It also allows the utility company to remotely control initiation or deactivate service. As a result of these features, AMI meters have drastically reduced the need for a utility company representative to read a meter at the physical location of the meter—a major benefit to utility companies and customers alike.

In general, AMI meters utilize a local area network (LAN) to communicate with a gateway node. The gateway node, in turn, communicates directly with the utility company over a fixed common carrier wide area network (WAN). U.S. Pat. No. 7,277,027, which is incorporated entirely herein by reference, discloses a gateway node that provides end-to-end communication between the AMI meter and the utility company. Gateway nodes must be located within communication range of the common carrier WAN and the LAN associated with the smart meter. In addition, gateway nodes require a suitable power source. As such, gateway nodes have been designed for installation directly on utility poles, street lights or other overhead mounting facilities.

Available gateway nodes, however, suffer from significant drawbacks associated with installation. One drawback is that they generally require the availability of overhead mounting facilities as detailed above. In many areas, though, overhead mounting facilities are unavailable, difficult to access, or lacking of a suitable power source. Another drawback is the susceptibility of gateway nodes to theft. That is, if gateway nodes are readily accessible to the public, the hardware components may be stolen. At least these drawbacks of gateway nodes have hindered rapid and efficient deployment of communication-enabled smart meters.

SUMMARY

The following presents a simplified summary of the invention in order to provide a basic understanding of some aspects of the invention. This summary is not an extensive overview of the invention. Rather than specifically identify key or critical elements of the invention or to delineate the scope of the invention, the purpose of the following summary is to present aspects of the invention in a simplified form as a prelude to the more detailed description that is presented later.

In accordance with one embodiment, a gateway node for an advanced metering infrastructure (AMI) is provided. The gateway node includes a housing having a main chamber with a top and a bottom. The main chamber defines an interior space within the housing. In one embodiment, a plurality of mounting brackets are affixed to the interior wall of the main chamber. Each of the plurality of brackets is affixed to the housing uses multiple bolts inserted through pre-drilled holes in the housing. The gateway node further conduits through which cables can be inserted into the main chamber. For example, the gateway node may have a conduit at the bottom and a conduit at the top of the housing. The gateway node may be a direct burial enclosure.

The gateway node is also provided with a relay to transmit and receive data over a network. The network may be a wired or a wireless network. For wireless networks, the relay is provided with an antenna, which may be removably connected to the relay. The antenna element transmits or receives data over the wireless network. The antenna element may be positioned external to the housing. The antenna element being positioned externally may extend through the top of the housing with a sealant around the opening. The sealant prevents dirt, water, and the like from entering the housing.

Other advantages and novel features of the invention will become apparent by referring to the drawings and detailed description.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

The following detailed description and the appended drawings describe examples of the embodiments of the invention solely for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention. Such details include conventional details of fabrication and assembly, as well as alternative structural, logical, and electrical variations of the disclosed embodiments.

Regarding the meaning of certain terms in this document, the terms "a" or "an" mean one or more than one. The term "or" refers to a nonexclusive "or." References to "one embodiment" do not exclude the existence of additional embodiments that also incorporate the recited features. Embodiments "comprising" or "having" a feature may also include additional features.

Figure 1:
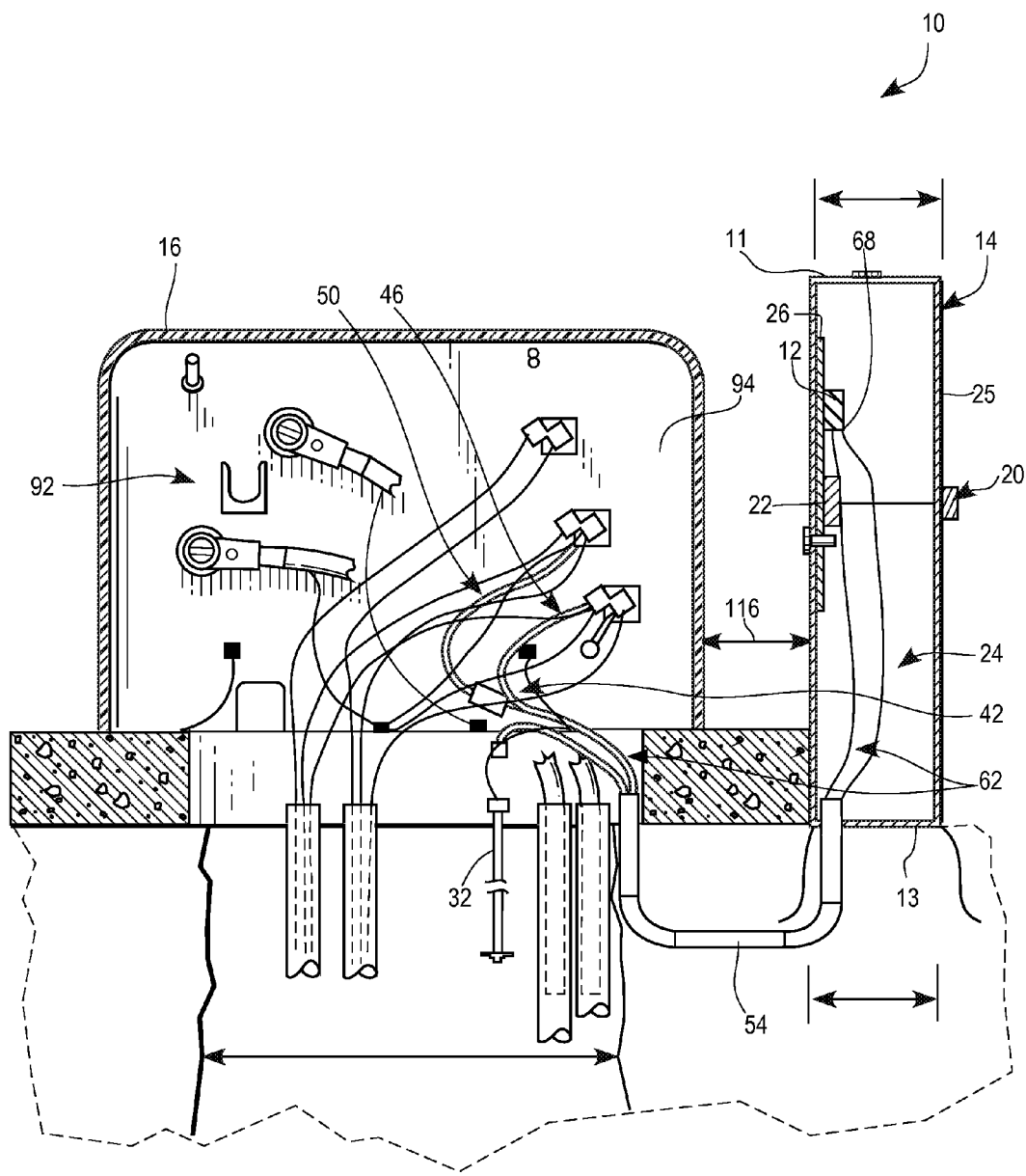
FIG. 1 illustrates a cross-sectional front view of a gateway node in accordance with an embodiment.
Figure 2:
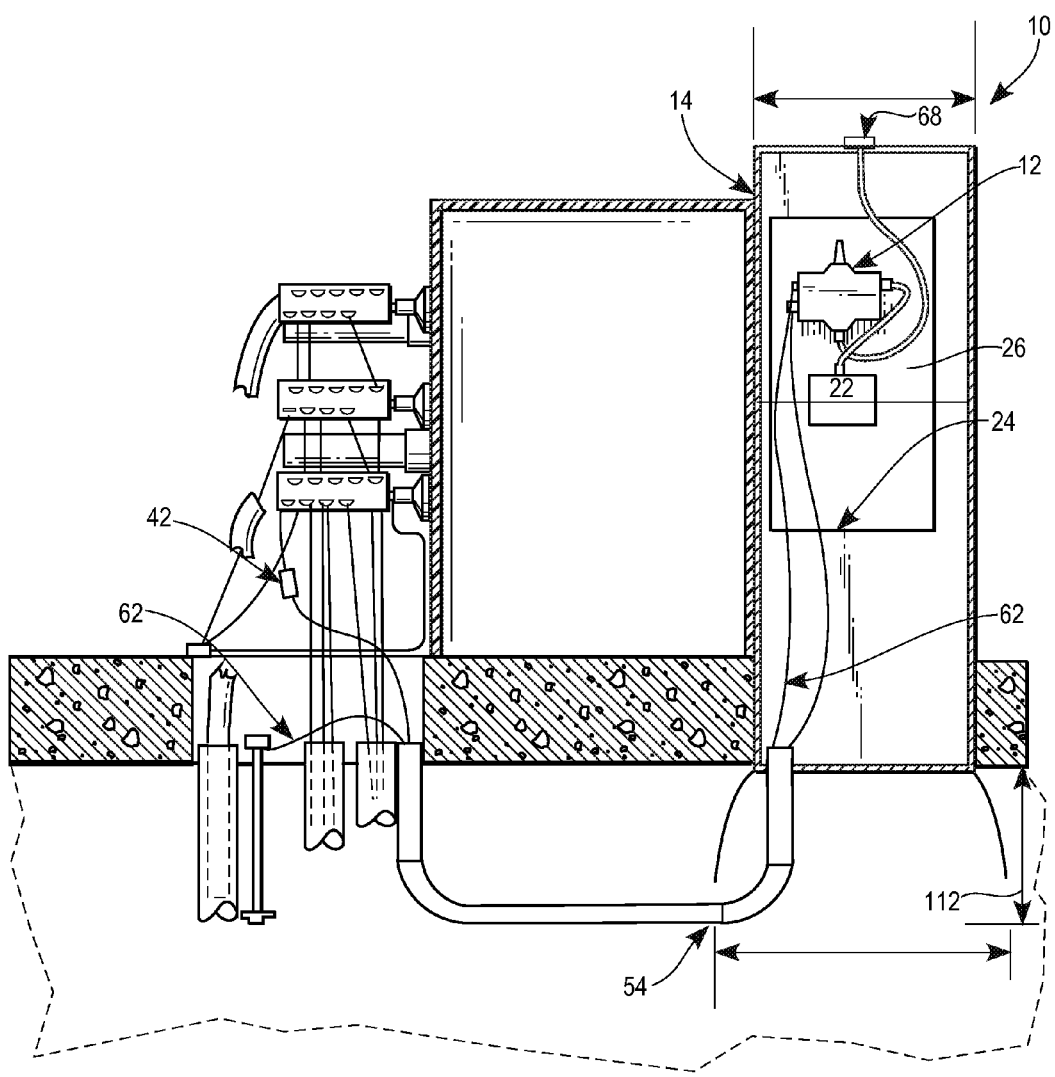
FIG. 2 illustrates a cross-sectional side view of the gateway node in accordance with an embodiment.
Figure 3:
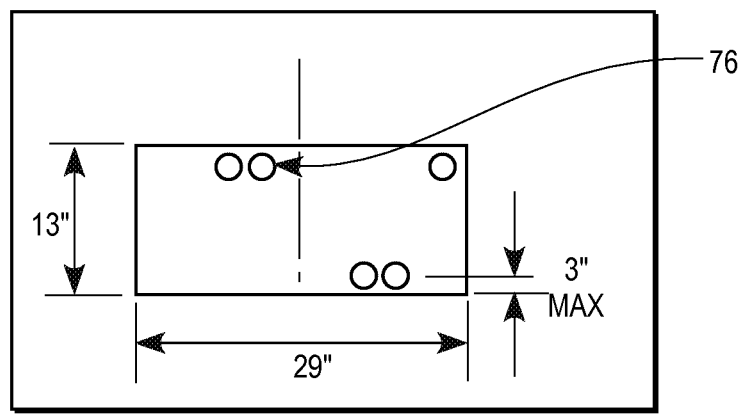
FIG. 3 illustrates a top view of a gateway node transformer pad in accordance with an embodiment.

In general, FIGS. 1-2 illustrate one embodiment of a gateway node facility 10. As more fully described below, gateway node 10 includes a housing 14 that contains a relay 12. Housing 14 is connected to a pad mount transformer 16 by one or more buried conduits 54 and cables running through the conduits 54. The relay 12 may be powered by a power cable 24 and grounded using a ground cable 62. The power cable 24 and the ground cable 62 pass through conduit 54 and are connected, respectively, to the secondary side 94 and ground terminal 32 of the transformer 16. In case of a power loss to the transformer 16, an alternative energy source is provided as a backup battery 22, which is also connected to the relay 12. The relay 12 is connected to antenna 68. The relay 12 thus has the capacity to send and receive data between a utility company and an AMI-meter over a LAN or WAN.

Figure 4:
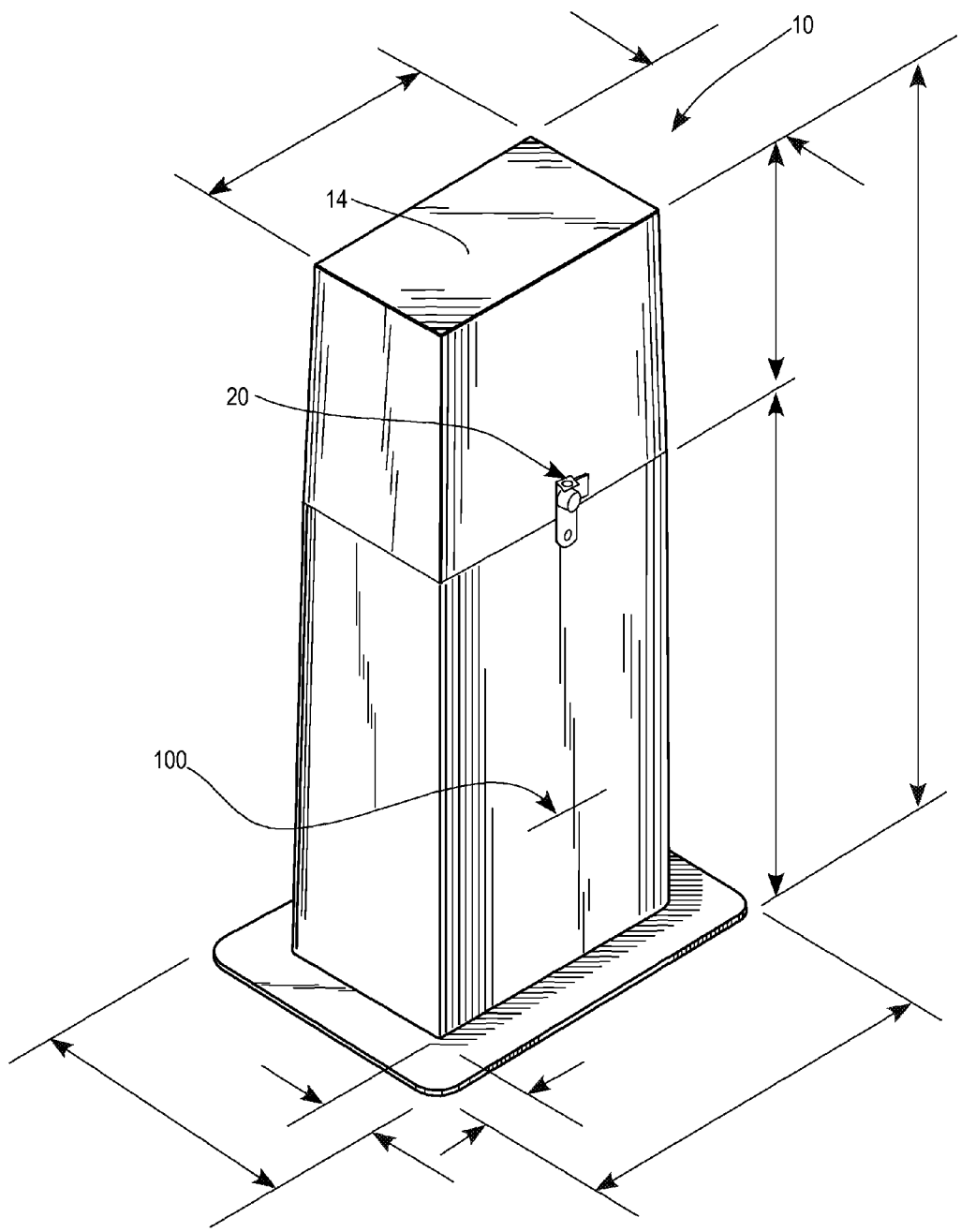
FIG. 4 illustrates a perspective side view of the gateway node in accordance with an embodiment.
Figure 5:
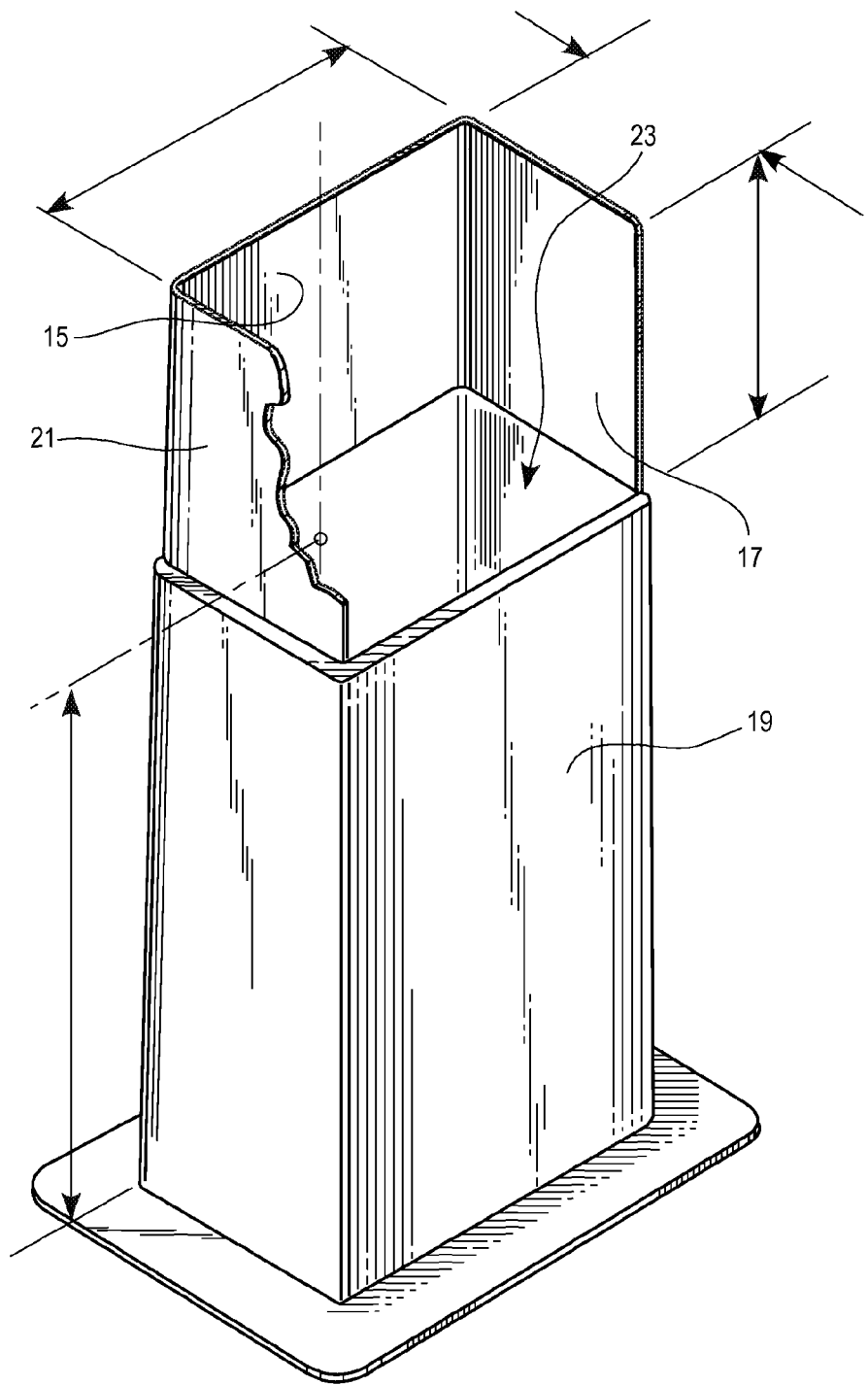
FIG. 5 illustrates a partial cutaway perspective side view of the gateway node in accordance with an embodiment.

As illustrated in FIG. 1, housing 14 has a top 11, a bottom 13 and side walls 15, 17, 19, 21. Referring to FIG. 5, together, top 11, bottom 13 and sides 15, 17, 19, 21 of housing 14 form an isolated interior chamber 23 that is secure and weather resistant. Conduits are disposed through bottom 13. For example, as shown in FIG. 2, gateway node 10 may have a conduit 54 at the bottom 13 and a conduit at the top 11 of the housing 14. As illustrated in FIG. 4, housing 14 may be configured such that the lower portion of housing 14 is buried to a predetermined bury depth 100 such that the housing is firmly secured to the ground. Additionally, as illustrated in FIG. 4, housing 14 can be provided with a removable or hinged access cover 25 that is secured by a keyed or coded lock 20. This limits unauthorized access, tampering or theft of the relay 12 or any related hardware.

Housing 14 of gateway node 10 is positioned on the secondary side 94 of transformer 16 to provide a convenient conduit 54 access point to transformer 16, while allowing unobstructed access to primary side 92. Secure enclosure/housing 14 is separated from transformer 16 by a distance 116, which is approximately twelve inches or less in accordance with one embodiment. In addition, secure enclosure/housing 14 is buried, at least in part, and preferably to a minimum depth 112 of approximately twelve inches.

Referring to FIG. 1, a mounting bracket 26 is affixed to the interior wall of the main chamber 23 using one or more bolts in pre-drilled holes. The mounting bracket 26 is used to secure the relay 12 within the chamber 23. Additional brackets may also be included in housing 14 to provide support to mount a backup battery 22 or other hardware.

As shown in FIG. 2, gateway node 10 includes a relay 12 to transmit and receive data over a network. The network may be a wired or a wireless network. In embodiments configured for use over a wireless network, the gateway node 10 is provided with an antenna cable. The antenna cable is removably connected at one end to relay 12 and has an antenna element 68 at a second end. The antenna element 68 is configured to transmit or receive data over a network. Antenna element 68 may be positioned external to the housing 14 through a conduit provided on top 11 of housing 14. More specifically, where an external antenna element 68 is used, the enclosure can be drilled at the time of installation or predrilled with a one half inch hole in the center of the enclosure top 11. Antenna element 68 is fed through the hole and is connected to relay 12. Antenna element 68 is then attached to the top 11 of the enclosure using sealant to prevent water intrusion.

Conduit 54 at the bottom 13 of the housing 14 of the gateway node 10 may be used to tunnel cables. The cables may be tunneled to and from a transformer, an AMI meter and the like or any combination thereof. For example, the tunnel may be a PVC conduit 54. Upon installation of housing 14, conduit 54 may buried so as to provide a passageway between the secure enclosure/housing 14 and the secondary side 94, and in particular, secondary conduits 76 (see FIG. 5), of transformer 16. One inch PVC conduit may be used as conduit 54, although numerous other conduit materials can be used as alternatives.

The gateway node 10 may also include a first power cable 24, a second power cable 50 and an in-line fuse 42. The first power cable 24 may have one end connected to the relay 12 of the said gateway node 10 and the other end connected an in-line fuse 42. Additionally, the second power cable 50 may have one end connected to the in-line fuse 42 and a second end connected to a powered hardware device. For example, the device may be a transformer, an AMI meter and the like or any combination thereof.

An exemplary process to assemble the gateway node 10 includes pulling through the conduit 54 a power cable 24 (3/C #14 Copper cable), and ground cable 62 (#6 solid copper ground wire). The power cable 24 and ground cable 62 are then attached to transformer 16 by a ring bond. An in-line fuse 42, such as an eight Amp in-line fuse, is then attached between first power cable 24 and second power cable 50, which is attached to the secondary side 94. The in-line fuse 42 can be attached by stripping back insulation of power cable 24 from enclosure 14, doubling up the wire of power cable 24, connecting power cable 24 to the load-side of in-line fuse 42, crimping and securing it with rubber splicing tape. Then power cable 50 is connected to the line side of in-line fuse 42, crimped and secured with splicing tape, and attached to power cable 24 from line side of fuse 42 to lower power phase of transformer 16 multitap connector (usually the street light port). In addition, the neutral wire 46 of power cable 24 is connected to transformer 16 by stripping back insulation, doubling up neutral wire 46, and connecting it to the transformer 16 neutral multitap connector (usually the street light port). Alternatively, a gel port or straight port connector can be used to connect neutral wire 46 with a piece of 1/0 aluminum cable. A terminal lug can then be crimped onto the 1/0 aluminum cable and bolted to the transformer 16 neutral spade.

Figure 6:
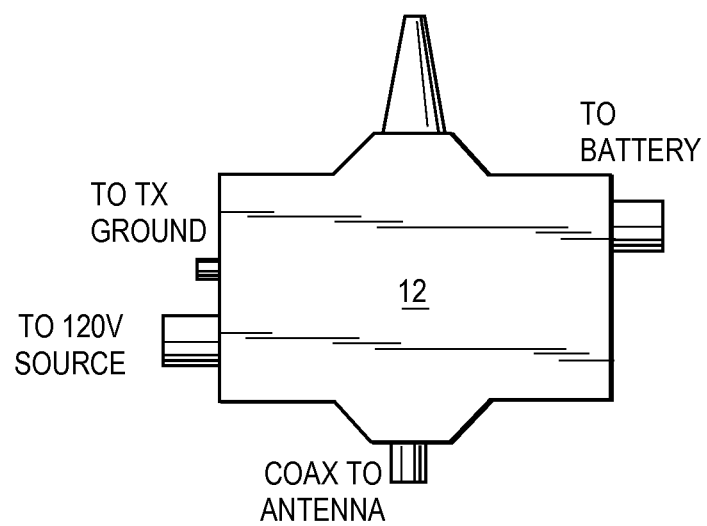
FIG. 6 illustrates a relay used within the gateway node in accordance with an embodiment.

Upon wiring of the transformer 16 side of the gateway node 10, and prior to installation of mounting bracket 26 in secure enclosure/housing 14, relay 12, antenna 68, and battery 22 are mounted to bracket 26. The power cable 24 and ground 62 are then connected to relay 12, as shown in FIG. 6. The mounting bracket 26 is then attached to the housing 14 using a ⅜" by 2" stainless carriage bolt in a predrilled hole location on back of the enclosure, with a ⅜" stainless flat washer, lock washer and nut.

The tunnel of the gateway node 10 may be adapted to provide conduit 54 to house at least a ground cable, a neutral cable, and a power cable. Moreover, tags may be connected to the cables to identify the cables within the housing 14. For example, white plastic URD tag can then be used to identify incoming cables and provide appropriate service directions.

In addition, the gateway node 10 may include a battery 22 to provide operational power to the gateway node 10. In case of power loss to the transformer 16, an alternative energy source is provided as backup battery 22, which is also connected to relay 12. For example, the battery 22 may be a rechargeable battery 22. The battery 22 may receive its charging current from the transformer or an AMI network. Optionally, the battery 22 may receive its charging current from an independent photoelectric unit. The gateway node 10 may be electrically connected to an Automated Meter Reading (AMR) system configured to collect data from AMI meters, a plurality of transformers and the like or any combination thereof.

Figure 7:
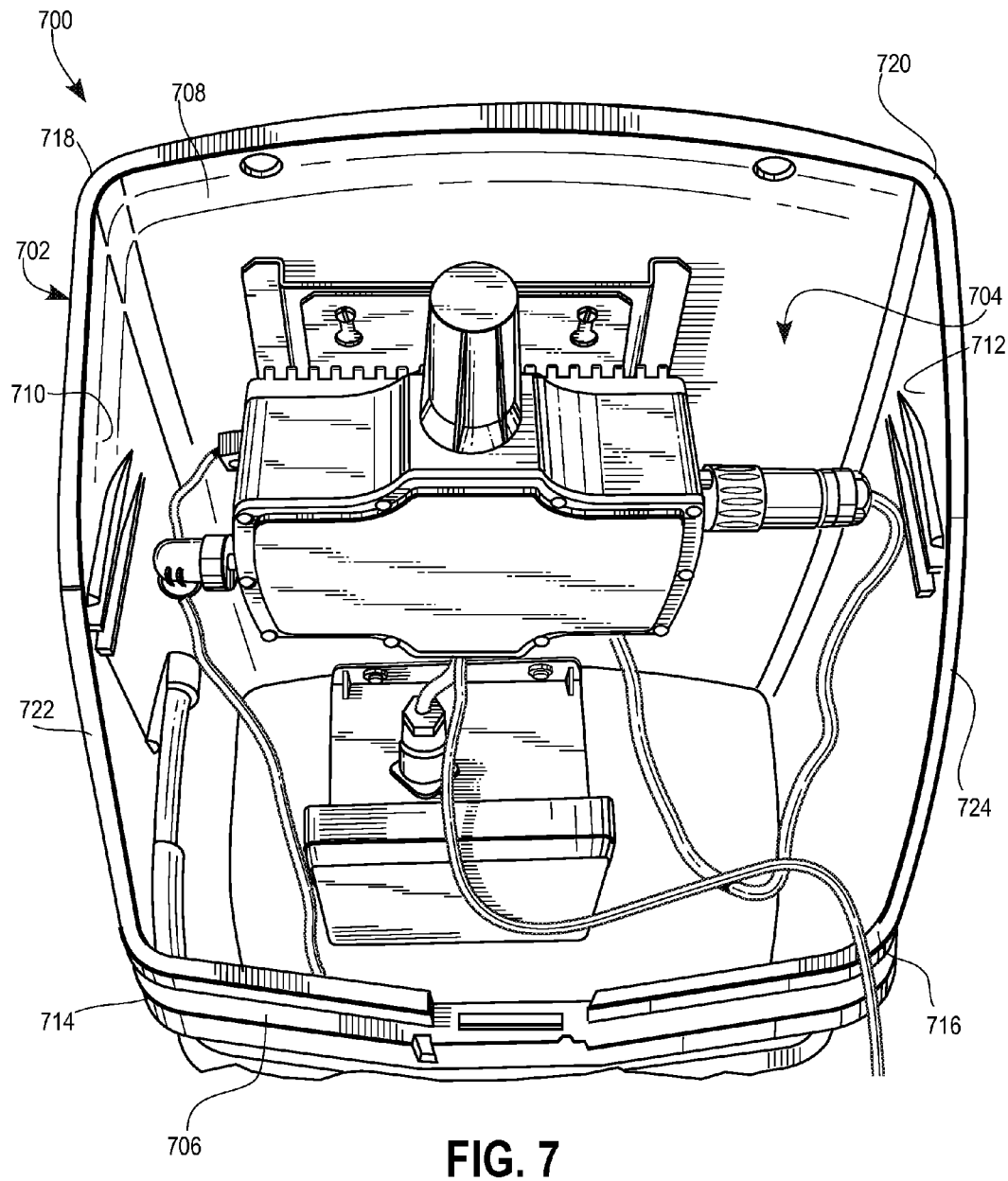
FIG. 7 illustrates an alternate embodiment of the gateway node housing 700.

FIG. 7 illustrates an alternate embodiment of gateway node 700 housing 702. As described in FIG. 7, gateway node 700 has a main chamber 704 with four walls (a first wall 706, a second wall 708, a third wall 710 and a fourth wall 712). The first wall 706 and the second wall 708 are positioned opposite to each other and similarly, the third wall 710 and the fourth wall 712 positioned opposite to each other. The gateway node housing of FIG. 7 provides a wider access window to the devices inside the housing 702. The wider access is provided using different heights of the first wall 706 and the second wall 708. For example, the first wall 706 height being shorter than the second wall 708 height. The first wall 706 and the second wall 708 may be one of a rectangular or a square shaped.

The third wall 710 and the fourth wall 712 connect the first wall 706 at a first side 714, 716. The third wall 710 and the fourth wall 712 connect the second wall at an opposite second side 718, 720. The third wall 710 and the fourth wall 712 connect the first wall 706 and the second wall 708 such that the top edge 722 of the third wall 710 and the top edge 724 of the fourth wall 712 have a slope, as shown in the FIG. 7. Moreover, the cover (not shown) is removably attached to the top of the chamber 704 such that the cover sealingly receives the chamber 704 within its cavity. The cover may be shaped as a cube, or a cuboid, or a rectangular prism.

Many other embodiments will be apparent to those of skill in the art upon reviewing this detailed description. The scope of the invention should, therefore, be determined with reference to the following claims, along with the full scope of equivalents to which such claims are entitled. In the following claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A gateway node for an advanced metering infrastructure (AMI), the gateway node comprising:
   a housing having a top, a bottom, and side walls defining a main chamber, wherein at least one of the top, the bottom, and the side walls is removably attached to the housing;
   a relay configured to transmit and receive data over a wired or a wireless network;
   a mounting bracket disposed within the main chamber and connecting the relay to the housing;
   a pad mount transformer; and
   a conduit forming a passageway between the pad mount transformer and the housing;
   wherein the conduit can accommodate a first power cable for supplying power from the transformer to the relay.

2. The gateway node of claim 1, further comprising an antenna electrically coupled to the relay.

3. The gateway node of claim 2, wherein the antenna is internal to the housing.

4. The gateway node of claim 2, wherein the antenna is sealingly disposed through the top of the housing.

5. The gateway node of claim 1, wherein a second bracket is disposed within the main chamber to provide support to mount a backup battery.

6. The gateway node of claim 1, wherein a portion of the top and the side walls is removably attached to the housing, thereby allowing a user to access the chamber by removing the portion of the top and the side walls that is removably attached to the housing.

7. The gateway node of claim 6, wherein a first side wall from said side walls is shorter than a second side wall from said side walls.

8. The gateway node of claim 1 further comprising a locking assembly, the locking assembly comprising at least one of a penta socket, standard lock, and a key, the key being configured to open the lock and allow removal of the at least one of the top, the bottom, and the side walls that is removably attached to the housing.

9. A gateway node for an advanced metering infrastructure (AMI), the gateway node comprising:
   a housing having a top, a bottom, and side walls defining a main chamber, wherein at least one of the top, the bottom, and the side walls is removably attached to the housing;
   a relay configured to transmit and receive data over a wired or a wireless network;
   a mounting bracket disposed within the main chamber and connecting the relay to the housing;
   an AMI meter; and
   a conduit forming a passageway between the AMI meter and the housing; wherein the conduit can accommodate a first power cable for supplying power from the AMI meter to the relay.

10. The gateway node of claim 1, further comprising an antenna electrically coupled to the relay.

11. The gateway node of claim 10, wherein the antenna is internal to the housing.

12. The gateway node of claim 10, wherein the antenna is sealingly disposed through the top of the housing.

13. The gateway node of claim 9, wherein a second bracket is disposed within the main chamber to provide support to mount a backup battery.

14. The gateway node of claim 9, wherein a portion of the top and the side walls is removably attached to the housing, thereby allowing a user to access the chamber by removing the portion of the top and the side walls that is removably attached to the housing.

15. The gateway node of claim 14, wherein a first side wall from said side walls is shorter than a second side wall from said side walls.

16. The gateway node of claim 9, further comprising a locking assembly, the locking assembly comprising at least one of a penta socket, standard lock, and a key, the key being configured to open the lock and allow removal of the at least one of the top, the bottom, and the side walls that is removably attached to the housing.

17. A method for installing a gateway node, the method comprising:
   providing a housing in close proximity to a pad mount transformer, the housing having a top, a bottom, and side walls defining a main chamber, wherein at least one of the top, the bottom, and the side walls is removably attached to the housing;
   attaching a relay configured to transmit and receive data over a wired or a wireless network to a mounting bracket disposed within the main chamber;

providing a conduit forming a passageway between the pad mount transformer and the housing; and passing through the conduit a first power cable for supplying power from the transformer to the relay.

18. The method of claim 17, wherein the step of providing a housing comprises partially burying the housing underground.

19. The method of claim 17, wherein the step of providing a conduit comprises burying the conduit underground.

20. The method of claim 17, further comprising:
   connecting a first end of the first power cable to the relay, and connecting another end of the first power cable to an in-line fuse;
   connecting a first end of a second power cable to the in-line fuse and connecting a second end of the second power cable to a power terminal of the transformer;
   connecting a first end of a neutral cable to the relay and connecting a second end of the neutral cable to a neutral terminal of the transformer; and
   connecting a first end of a ground cable to the relay and connecting a second end of the ground cable to a ground terminal of the transformer.

21. The gateway node of claim 1, wherein said relay is an access point including a cellular modem.

22. The gateway node of claim 9, wherein said relay is an access point including a cellular modem.

23. The method of claim 17, wherein said relay is an access point including a cellular modem.

\* \* \* \* \*